(12) United States Patent
Chaloux et al.

(10) Patent No.: US 12,252,408 B2
(45) Date of Patent: Mar. 18, 2025

(54) SCALABLE METHOD FOR PREPARING CRYSTALLINE BOROSULFATE MATERIALS

(71) Applicant: The Government of the United States of America, as represented by the Secretary of the Navy, Arlington, VA (US)

(72) Inventors: Brian L. Chaloux, Alexandria, VA (US); James A. Ridenour, Arlington, VA (US); Albert Epshteyn, Potomac, MD (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 330 days.

(21) Appl. No.: 18/096,602

(22) Filed: Jan. 13, 2023

(65) Prior Publication Data
US 2023/0249978 A1 Aug. 10, 2023

Related U.S. Application Data

(60) Provisional application No. 63/307,839, filed on Feb. 8, 2022.

(51) Int. Cl.
*C01B 35/12* (2006.01)
(52) U.S. Cl.
CPC .................................. *C01B 35/12* (2013.01)
(58) Field of Classification Search
CPC ....................................................... C01B 35/12

USPC ........................................................ 423/277
See application file for complete search history.

(56) References Cited

U.S. PATENT DOCUMENTS 11,296,346 B2 4/2022 Epshteyn et al.

OTHER PUBLICATIONS

Hoppe et al. "The First Borosulfate K5[B(SO4)4]". Angew. Chem. Int. Ed. 2012, 51, 6255-6257. (Year: 2012).*
"Facile Proton Transport in Ammonium Borosulfate—An Unhumidified Solid Acid Polyelectrolyte for Intermediate Temperatures." Ward, M.D.; Chaloux, B.L.; Johannes, M.D.; Epshteyn, A. Adv. Mater. 2020, 32, 2003667.
"Borosulfates—Synthesis and Structural Chemistry of Silicate Analogue Compounds." Bruns, J.; Hoppe, H.A.; Daub, M.; Hillebrecht, H.; Huppertz, H. Chem. Eur. J. 2020, 26, 7966-7980.
International Search Report in PCT/US2023/010736, mailed May 9, 2023.
Written Opinion of the International Searching Authority in PCT/US2023/010736, mailed May 9, 2023.

(Continued)

*Primary Examiner* — Melissa S Swain
*Assistant Examiner* — Catriona M Corallo
(74) *Attorney, Agent, or Firm* — US Naval Research Laboratory; Roy Roberts

(57) ABSTRACT

A method of preparing borosulfate materials avoids the need for fuming sulfuric acid, also known as oleum. Instead, $B(OH)_3$ present in solution in concentrated sulfuric acid at 5% to 15% by weight is reacted with a cation source at 100-250° C. under dynamic vacuum while in connection with a receiving vessel comprising a desiccant and separate from the reaction vessel, thereby causing formation of a borosulfate material in the reaction vessel while eliminated water is collected in the receiving vessel.

6 Claims, 1 Drawing Sheet

(56) References Cited

OTHER PUBLICATIONS

Netzsch, P. et al., "Synthesis and characterization of the chain borosulfates (NH4)3[B(SO4)3] and Sr[B2(SO4)4]", Zeitschrift fuer Anorganische und Allgemeine Chemie, 2020, vol. 646, pp. 1-8.
Bruns, J. et al., "Borosulfates Synthesis and Structural Chemistry of Silicate Analogue Compounds", Chemistry A European Journal, 2020, vol. 26, pp. 7966-7980.

* cited by examiner

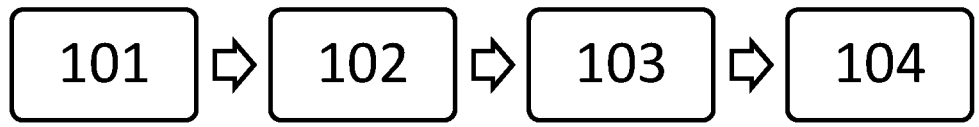

SCALABLE METHOD FOR PREPARING CRYSTALLINE BOROSULFATE MATERIALS

CROSS-REFERENCE TO RELATED APPLICATIONS

This Application claims the benefit of U.S. Provisional Patent Application No. 63/307,839 filed on Feb. 8, 2022, which is incorporated herein by reference in its entirety.

This Application is related to U.S. Pat. Nos. 9,409,936, 9,567,359, 10,249,403 and 10,510,458 as well as U.S. Patent Application Publication No. 2021/0159530.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing NC 210976.

BACKGROUND

A variety of inorganic borosulfate materials comprising anionic boron-, sulfur-, and oxygen-containing species charge balanced with various cations (e.g. $H_3O^+$, $NH_4^+$, $Sr^{2+}$) have been documented by several research groups (see, e.g. "Borosulfates—Synthesis and Structural Chemistry of Silicate Analogue Compounds." Bruns, J.; Hoppe, H. A.; Daub, M.; Hillebrecht, H.; Huppertz, H. *Chem. Eur. J.* 2020, 26, 7966-7980). Among these, materials containing one-dimensional, anionic borosulfate chains have been identified as promising proton-conducting materials [US Patent App. 20210159530 and "Facile Proton Transport in Ammonium Borosulfate—An Unhumidified Solid Acid Polyelectrolyte for Intermediate Temperatures." Ward, M. D.; Chaloux, B. L.; Johannes, M. D.; Epshteyn, A. *Adv. Mater* 2020, 32, 2003667]. However, traditional synthesis methods for this class of materials relies on the use of concentrated, fuming sulfuric acid (a.k.a. Oleum, typically 60+% sulfur trioxide by weight) as both reagent and solvent from which crystals are grown. As this industrial chemical is extremely corrosive, working with it can be expensive and exceptionally hazardous. Additionally, slow evaporation of fuming sulfuric acid necessitates that the process takes several days and can cause significant damage to surrounding equipment, even in a well-ventilated environment. Furthermore, this slow, evaporative process favors exclusively large product crystallites and is not amenable to alteration of nucleation and growth kinetics, which is important for maximizing surface area of the product A need exists for new techniques for the preparation of materials comprising one-dimensional, anionic borosulfate chains.

BRIEF SUMMARY

In one embodiment, a method of preparing borosulfate materials includes providing in a reaction vessel a solution of $B(OH)_3$ in concentrated sulfuric acid at 5% to 15% by weight; adding a cation source thereto; and then heating the solution to 150-200° C. under dynamic vacuum while in connection with a receiving vessel comprising a desiccant and separate from the reaction vessel, thereby causing formation of a borosulfate material in the reaction vessel while eliminated water is collected in the receiving vessel.

BRIEF DESCRIPTION OF THE DRAWING

FIG. 1 provides a schematic depiction of a process for preparing borosulfate material as described herein. First, 101, a reaction vessel is provided with a solution of $B(OH)_3$ in concentrated sulfuric acid at 5% to 15% by weight, then 102 a cation source is added thereto, and then 103 this is heated to 100-250° C. under dynamic vacuum while in connection with a receiving vessel comprising a desiccant and separate from the reaction vessel, resulting in 104 formation of a borosulfate material in the reaction vessel while eliminated water is collected in the receiving vessel as described herein.

DETAILED DESCRIPTION

Definitions

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the term "oleum" refers to sulfuric acid containing excess sulfur trioxide.

As used herein, the term "one-dimensional" with regard to borosulfate refers to an anionic borosulfate chain of indefinite length.

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Overview

Described herein is the synthesis of one-dimensional borosulfate materials with various cations and crystal structures is achieved with the use of only minimal reagent-grade sulfuric acid as solvent. Generally, boric acid [$B(OH)_3$] is dissolved as a 5-15 wt. % solution in concentrated (98%) sulfuric acid ($H_2SO_4$), to which an approximately equimolar amount of cation source, typically a sulfate salt such as $(NH_4)_2SO_4$, is added. The reaction mixture is added to a flask attached to a distillation apparatus in which a desiccant (typically concentrated $H_2SO_4$) is added to the receiving flask. The reaction mixture is heated to 100-250° C. under dynamic vacuum for several hours, causing water eliminated from the reaction to be collected in the receiving flask, in turn driving the reaction to completion. Product typically precipitates as a slurry of white solid when the reaction is complete and can be suction filtered from the sulfuric acid mother liquor/filtrate on a fritted glass funnel, washed with a polar organic solvent, such as ethanol or isopropanol, and dried in vacuo resulting in pure borosulfate in up to 90% isolated yield.

Example A

Intermediate Crystallite Size Ammonium Borosulfate, $NH_4[B(SO_4)_2]$

To a 500 mL round-bottom flask, 50.236 g $B(OH)_3$ (0.8125 mol), 56.205 g ammonium sulfate ($[NH_4]_2SO_4$, 0.4253 mol), and 300 mL concentrated (98%) $H_2SO_4$ were added. A magnetic stir bar was added to the flask, a water-cooled distillation head attached, and 75 mL concentrated $H_2SO_4$ were added to the receiving flask on the other end, acting as a desiccant for moisture evolved during the reaction. The reaction mixture was heated to 200° C. under dynamic vacuum for 60 hours, after which the white, crystalline product was suction filtered from the hot mother liquor and washed successively with glacial acetic acid and ethanol. The product was dried at 70° C. under vacuum overnight and weighed at 146 g (81% isolated yield). The crystallites were measured by optical microscopy to be 400 µm long by 25 µm wide needles, on average.

Example B

Small Crystallite-Size Ammonium Borosulfate, $NH_4[B(SO_4)_2]$

To a 100 mL round-bottom flask, 5.0220 g $B(OH)_3$ (81.22 mmol), 10.0864 g ammonium sulfamate ($NH_4SO_3NH$, 88.38 mmol), and 50 mL concentrated (98%) $H_2SO_4$ were added. The flask was attached to an air-cooled distillation head and a receiving flask containing 25 mL concentrated $H_2SO_4$ acting as desiccant. Dynamic vacuum (~150 mTorr) was applied to the system, the reaction vessel immersed in an oil bath, and the reaction heated to 210° C. with magnetic stirring for 3 hours. The reaction mixture proceeded from an initial suspension or coarse particulate, to a white slurry, to a colorless solution, and finally to a viscous slurry of white solids over time. The resultant solids were suction filtered off the residual solvent on a fritted filter funnel then washed multiple times with isopropanol and dried under vacuum at 60° C. for 16 hours. The fluffy, white powder was weighed at 15.6122 g (87% isolated yield) and its identity confirmed by powder x-ray diffraction (PXRD), infrared spectroscopy, and x-ray photoelectron spectroscopy. Crystallites were needles 10 µm long by 1 µm wide on average, as assessed by optical microscopy.

Example C

Potassium Borosulfate, $K[B(SO_4)_2]$

To a 100 mL round-bottom flask, 10.132 g $B(OH)_3$ (136.9 mmol), 14.951 g $K_2SO_4$ (85.8 mmol), and 50 mL concentrated (98%) $H_2SO_4$ were added. The flask was attached to an air-cooled distillation head and a receiving flask containing 50 mL concentrated $H_2SO_4$ acting as desiccant. Dynamic vacuum (~150 mTorr) was applied to the system, the reaction vessel immersed in an oil bath, and the reaction heated to 200° C. with magnetic stirring for 3 hours. The clear, colorless reaction mixture slowly became viscous, then rapidly precipitated white solid, becoming a slurry; at this point, heating was ceased and the mixture cooled to room temperature. The fine white solids were suction filtered off the remaining liquid on a fritted filter funnel, washed with isopropanol, and dried under vacuum at 230° C. for 1 hour. The solids were weighed at 36.128 g (91% isolated yield) and their identity confirmed by infrared spectroscopy and powder and single crystal x-ray diffraction.

Example D

Sodium Borosulfate, $Na[B(SO_4)_2]$

To a 100 mL round-bottom flask, 6.200 g $B(OH)_3$ (100 mmol), 6.254 g $Na_2SO_4$ (44 mmol), and 50 mL concentrated (98%) $H_2SO_4$ were added. The flask was attached to a water-cooled distillation head and a receiving flask containing 50 mL concentrated $H_2SO_4$ acting as desiccant. Dynamic vacuum (~150 mTorr) was applied to the system, the reaction vessel immersed in an oil bath, and the reaction heated to 200° C. with magnetic stirring for approximately 16 hours. The clear, colorless reaction mixture slowly became viscous, followed by a rapid precipitation of a white solid. The fine white solids in residual $H_2SO_4$ were diluted with tetramethylenesulfone (sulfolane) and suction filtered off with a fitted filter funnel, washed with isopropanol, and dried under vacuum overnight. The crude solids were weighed at 15.125 (76% yield based on $Na_2SO_4$) and characterized by powder x-ray diffraction and infrared spectroscopy. The IR spectrum closely matched the related borosulfate $K[B(SO_4)_2]$, and PXRD identified the predominant species as $Na[B(SO_4)_2]$ (which is not isostructural with $K[B(SO_4)_2]$). Small crystalline impurities in the product were also identified by PXRD.

Example E

Ammonium-Potassium Borosulfate Solid Solution, $(NH_4)_xK_{1-x}[B(SO_4)_2]$

Solid solutions with varied percentages of ammonium or potassium can be achieved by using a mixture of $(NH_4)_2SO_4$ and $K_2SO_4$ at the desired ratio. To a 100 mL round-bottom flask, 6.185 g $B(OH)_3$ (100 mmol), 3.562 g $(NH_4)_2SO_4$ (27 mmol), 4.706 g $K_2SO_4$ (27 mmol), and 50 mL concentrated (98%) $H_2SO_4$ were added. The flask was attached to a water-cooled distillation head and a receiving flask containing 50 mL concentrated $H_2SO_4$ acting as desiccant. Dynamic vacuum (~150 mTorr) was applied to the system, the reaction vessel immersed in an oil bath, and the reaction heated to 200° C. with magnetic stirring for approximately 16 hours. The clear, colorless reaction mixture slowly became viscous, followed by a rapid precipitation of a white solid. The fine white solids were diluted with tetramethylenesulfone (sulfolane) and suction filtered off with a fritted filter funnel, washed with isopropanol, and dried under vacuum overnight. The solids were weighed at 11.132 (48.1% yield). Crystallite size was too small to successfully perform single-crystal X-ray diffraction on the product, but powder X-ray diffraction confirms that only a single phase is present, which is isostructural with both $NH_4[B(SO_4)_2]$ and $K[B(SO_4)_2]$. Since the lattice parameters of $NH_4[B(SO_4)_2]$ and $K[B(SO_4)_2]$ are slightly different, two separate, overlapping sets of diffraction peaks would be visible were the product a physical mixture of phase pure ammonium and potassium borosulfate, rather than a solid solution.

Further Embodiments

Other cation sources than sulfate salts may be utilized to prepare borosulfates per the description above (see Example B). These sources can include halide salts (such as $NH_4Cl$ or KBr) and sulfate derivatives that can decompose to $SO_4^{2-}$ in situ (such as sulfamic acid [$NH_2SO_3H$] or ammonium sulfamate [$NH_4SO_3NH_2$]), and combinations of these. These compounds need not be highly soluble in the solvent; reactions may be accomplished even if the reagents are only sparingly soluble. Oxygen-containing species such as phosphates and chlorates are generally not recommended, as they may interfere with the chemistry of the reaction. Mixed cation sources may also be utilized, resulting in borosulfate products containing multiple species of cation (see Example E).

Alternate cations such as Li, Cs, etc. could be used.

While concentrated sulfuric acid is the reported solvent for the above examples, mixtures of sulfuric acid (which is also a reagent) and other non-volatile polar solvents that are stable in sulfuric acid may also be used, for example: sulfolane (tetramethylenesulfone). Anhydrous co-solvents are preferred, since water must be removed by vacuum distillation to drive the reaction to completion.

Advantages

This methodology represents a significant improvement in the synthesis of borosulfate materials over previously reported synthetic methods that utilize Oleum as solvent and reactant. Not only does the replacement of oleum with reagent-grade, concentrated sulfuric acid minimize cost, but it also provides several other benefits. It reduces the time required to synthesize borosulfates (from several days to several hours), increases the scale at which these reactions can safely be performed; introduces crystallite size control in the size regime of 0.1-100 µm, and enables the synthesis of 'co-polymeric' borosulfates bearing mixtures of cationic counterions.

Concluding Remarks

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

What is claimed is:

1. A method of preparing borosulfate materials, the method comprising:
   providing in a reaction vessel a solution of $B(OH)_3$ in concentrated sulfuric acid at 5% to 15% by weight;
   adding a cation source thereto; and then
   heating the solution to 100-250° C. under dynamic vacuum while in connection with a receiving vessel comprising a desiccant and separate from the reaction vessel,
   thereby causing formation of a borosulfate material in the reaction vessel while eliminated water is collected in the receiving vessel.

2. The method of claim 1, wherein said desiccant is concentrated sulfuric acid.

3. The method of claim 1, where the concentrated sulfuric acid is not oleum.

4. The method of claim 1, wherein the cation source comprises ammonium, potassium, and/or sodium.

5. The method of claim 1, wherein more than one cation source is used to produce a borosulfate material comprising multiple species of cation.

6. The method of claim 1, further comprising isolating the borosulfate material by filtration and washing it with a polar organic solvent.

* * * * *